United States Patent

[11] 3,601,789

[72] Inventors Shelby F. Sullivan
Arcadia;
Harper John Whitehouse, Hacienda
Heights, Calif.; Guy J. Andrews, Stoneham,
Mass.
[21] Appl. No. 864,780
[22] Filed Oct. 8, 1969
[45] Patented Aug. 24, 1971
[73] Assignee **The United States of America as
represented by the Secretary of the Navy**

[54] DEEP-SUBMERGENCE ACOUSTIC ARRAY STAVE
6 Claims, 5 Drawing Figs.
[52] U.S. Cl. ............................................... 340/9,
340/10, 340/13, 181/0.5
[51] Int. Cl. ..................................................... H04b 13/02
[50] Field of Search ........................................... 340/9

[56] References Cited
UNITED STATES PATENTS
2,768,364 10/1956 Camp ........................... 340/9

Primary Examiner—Rodney D. Bennett, Jr.
Assistant Examiner—H. A. Birmiel
Attorneys—Richard S. Sciascia, Ervin F. Johnston and John Stan ABSTRACT: A transducer assembly for deep submergence, acoustic, signal reception at a band of frequencies, including: a first elongated elastomeric member, generally in the shape of a stave; a second elongated elastomeric member having a thickness of one-quarter wavelength in the direction of preferred signal propagation; a plurality of spaced transducers embedded in the second elastomeric member in a linear row adjacent one surface; a slab of pressure release material, having a thickness of one-quarter wavelength in the direction of preferred signal propagation, and engaged in parallel relationship with a side of the second elastomeric member opposite the side closest to the transducers; the second elongated elastomeric member and the slab being embedded in the first elastomeric member; and each transducer having a pair of wires which extend from the second and first elastomeric members.

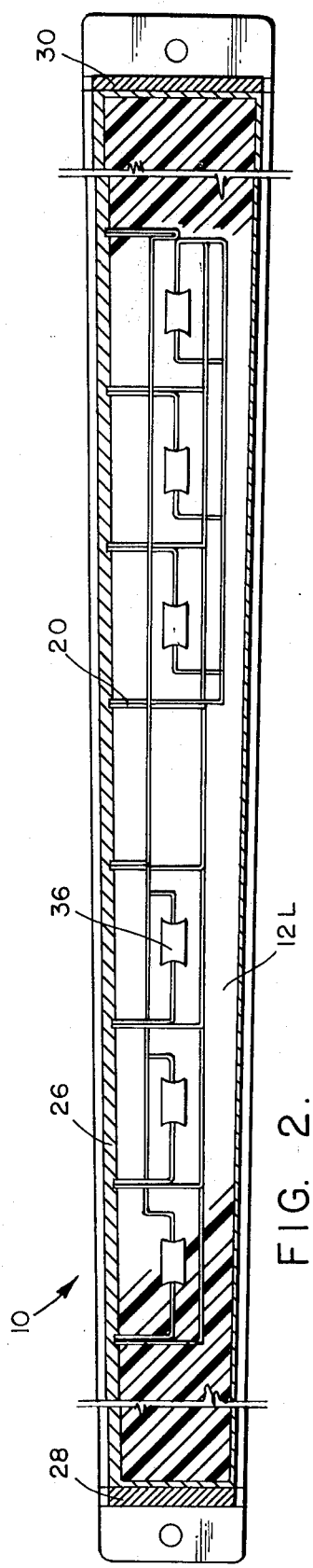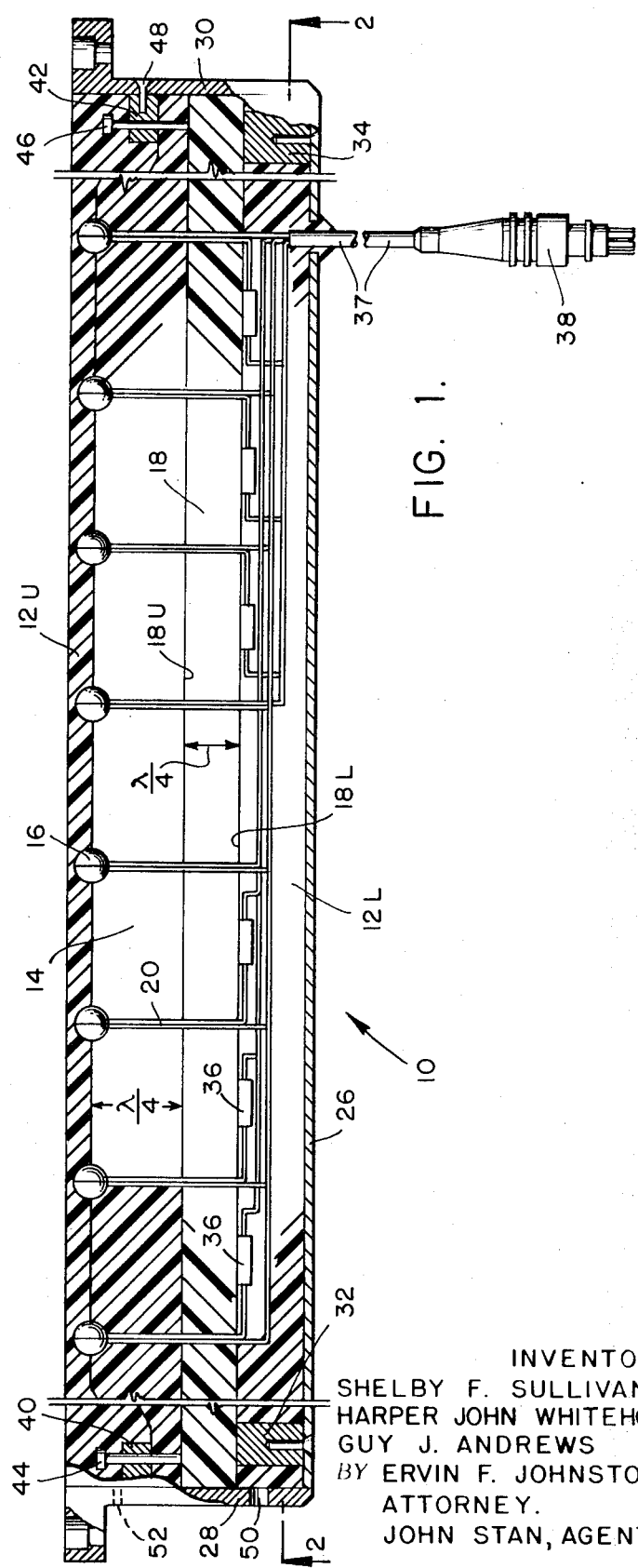

DEEP-SUBMERGENCE ACOUSTIC ARRAY STAVE

The invention described herein may be manufactured and used by or for the Government of the United States of America for governmental purposes without the payment of any royalties thereon or therefor.

This invention relates to a modular stave assembly designed for reception of sonar signals in a deep ocean environment to depths of 10,000 feet. The modular stave assembly can be combined with others like it to form a frustum of a cone. In order to achieve contiguous packing of the stave assembly, the stave is shaped asymmetrically.

With respect to the structure of each individual stave, so-called because it roughly resembles a barrel stave, a row of electroacoustic transducers are potted in a linear array one-quarter wave length above an isolator bar or slab made of a pressure release material suitable for operation at deep submergence. The isolator bar is one-quarter wavelength thick. The potting material, which may be polyurethane, has a velocity and density closely matching that of sea water, and therefore its acoustic refractive index and impedance approximates one referenced to sea water. The pressure release material exhibits a desired bulk modulus at the designed depth of operation of the stave, and its acoustic impedance is less than that of sea water.

Prior art methods have used either sparse arrays composed of elements well separated from acoustic scattering objects, or complicated arrays of gas-filled compliant tubing to isolate the array from scatterers in its vicinity.

Accordingly, an object of the invention is to provide a compact, modular, stave assembly capable of operation at great ocean depths, up to 10,000 ft.

Another object is to provide a stave containing a transducer assembly which is very simply fabricated.

A further object of the invention is to provide a transducer assembly whose components are so proportioned in terms of wavelengths as to result in the effective use of reflected waves.

Other objects and many of the attendant advantages of this invention will be readily appreciated as the same becomes better understood by reference to the following detailed description, when considered in connection with the accompanying drawings, in which like numerals designate like parts throughout the figures thereof and wherein:

FIG. 1 is a cross-sectional view of a single stave, including eight transducers differentially connected.

FIG. 2 is a sectional view of FIG. 1, showing the tapered stave construction.

Figure 4:
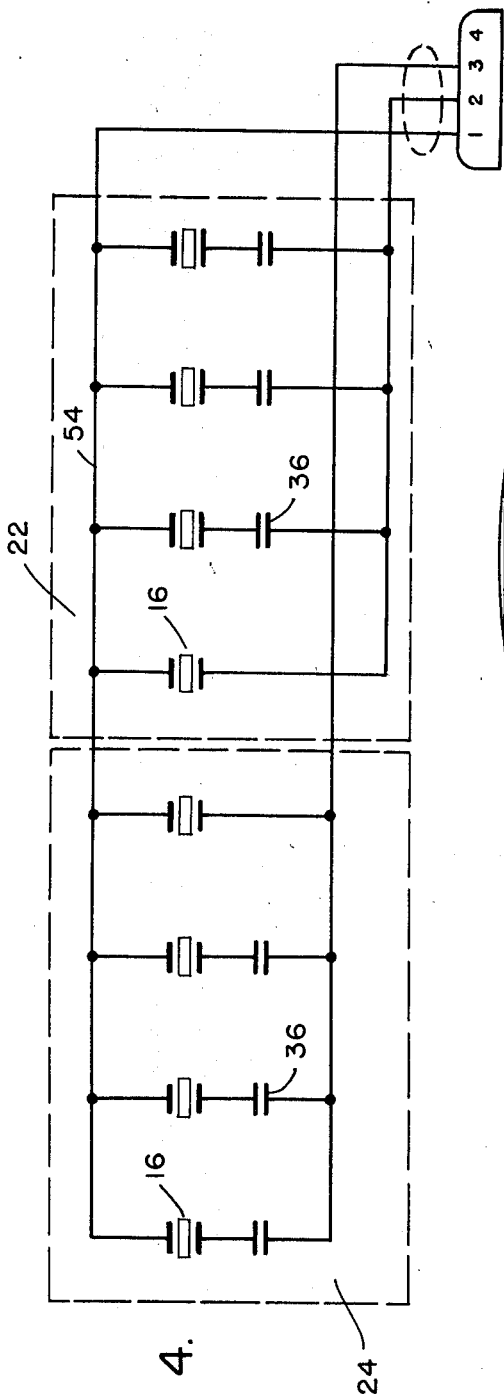
FIG. 4 is a schematic diagram of the transducer circuit, including shading capacitors, in each stave.

Referring now to the drawings, wherein like reference numerals designate like or corresponding parts throughout the several views, there is shown in FIG. 1, which illustrates a preferred embodiment, a transducer assembly 10 in the form of a stave for deep-submergence, acoustic, signal processing at a predetermined frequency, including a first elongated elastomeric member 12, having two main sections, an upper section 12U and a lower section 12L.

A second elongated elastomeric member 14 having a thickness of one-quarter wavelength in the direction of preferred signal propagation, which in FIG. 1 would be in the vertical direction, lies embedded in the first elastomeric member 12. A plurality of spaced transducers 16 are embedded in a linear row adjacent the top surface of the second elastomeric member 14. A slab of pressure release material 18, also having a thickness of one-quarter wavelength in the direction of signal propagation, is positioned in parallel engaging relationship with that side of the second elastomeric member 14 opposite the side location of the transducers 16. Each transducer 16 has a pair of insulated wires 20 which extend from the second and first elastomeric members 14 and 12.

Discussing now in more detail the mode of operation of the stave assembly, in use, 64 of the deep-submergence acoustic array staves 10 would be arranged in a complete circle to form an arrangement resembling a frustum of a cone, with the wide part of the cone at the bottom. Each of the 64 staves 10 fit snugly against each other when placed side by side.

Figure 5:
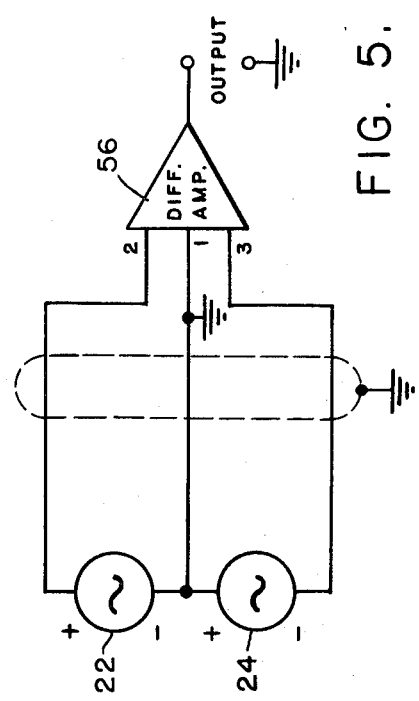
FIG. 5 is a schematic diagram showing how the circuit of FIG. 4 is connected to a differential amplifier.

The technique for forming a radiation pattern is to take the signal from each of the sample points, each stave having eight sample points, corresponding to the positions of the transducers 16, arranged in groups of four, 22 and 24, as shown in FIGS. 4 and 5. When used for signal detection, the eight transducers 16 sample the sound pressure field, and each produces a voltage proportional to the pressure of the sound pressure field impinging upon it.

When the deep-submergence, acoustic array, stave assembly is used for signal reception, the signal received by each of the sample signal points, one signal for each transducer 16, is so arranged that the signals projected from the chosen direction add up vectorially. In other, unwanted, directions the signals do not add up, but average or cancel out, resulting in a receiving pattern having minor lobes of negligible amplitude. For each individual signal emitted, the correct weighting function is chosen in time and amplitude such that the amplitude of the minor lobes is minimized. The mathematical techniques for doing this are well-developed, and are not detailed herein.

The first and second elastomeric elements 12 and 14, act as acoustic windows for the acoustic signals, while the slab 18 of pressure release material acts as a reflector of acoustic energy. Briefly defined, a pressure release material is one whose acoustic characteristic impedance is less than that of the medium in which the acoustic wave is propagating. The slabs 18 of pressure release material, when arranged in a circular array of 64 staves 10, act to isolate any structure interior to the stave assembly or "barrel" from the incident acoustic energy. Hence, the slab 18 may be called an isolator bar. More specifically, the upper surface 18U of the slab 18 acts as a partial reflector and partial transmitter of acoustic energy, while the lower surface 18L of the slab 18 also acts as a reflector of acoustic energy. The acoustic signal traverses a total of four quarter-wavelengths in traversing the distance from the transducers 16 to the lower surface 18L of the slab 18 and back to the transducers. The acoustic signal is therefore reinforced in the direction of preferred signal propagation.

Figure 3:
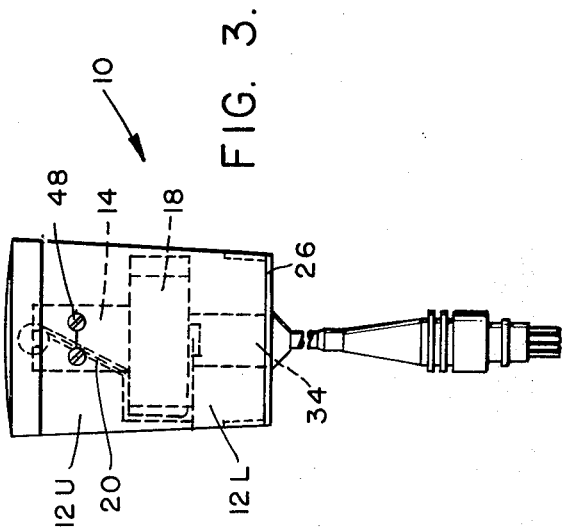
FIG. 3 is an end view of a stave.

With respect to the mode of assembly of the components of the individual stave 10, as performed in an embodiment actually built, as a first step, and referring to FIG. 1, the eight transducers 16, partially wired, are positioned in a mold, upside down with respect to the view shown in FIG. 1, and elastomeric material, for example polyurethane, is poured into the mold. FIG. 3 shows the angular position of the connecting wires 20. The precast polyurethane 14 is then taken out of the mold and cured. The polyurethane used may be the type manufactured by the Products Research and Chemical Corp. of Burbank, Calif., under the product name PR-1527.

The slab 18 of pressure release material is cast separately. The slab 18 may be Min-K 2000 material manufactured by the Johns-Mansville Co., of New York, N.Y. and consists essentially of a homogenous mixture of silica particles of a submicron size in a phenolic binder. A similar material is "Cab-O-Sil," manufactured by the Cabot Co. of Boston, Mass. More complete details on the composition of the specific material used, similar to the Min-K 2000 material but prestressed by a pressure equal in magnitude to the pressure at which the staves 10 are to be used, appear in U.S. Pat. application No. 754,267, filed on 21 Aug. 1968, entitled "Aggregate Pressure Release Material for Deep Submergence," and assigned to the same assignee as this invention.

In some earlier embodiments, the slab 18 had holes penetrating it for the wires 20, but in later embodiments, the wires skirted the sides of the slab as shown by the dotted lines in FIG. 3.

One of the primary advantages of this invention is that the slabs of pressure-release material 18 isolate the acoustic elements, namely the transducers 16, from structure such as capacitors used in series with some of the transducers, and a structural backbone as well as pressure vessels (not shown) and other structures within the finished multiple stave array.

In some embodiments, as a precautionary measure, the slab 18 was wrapped in a brass foil, not shown, serving the function of a vapor barrier for the slab since the surrounding polyurethane, over a long period of time, tends to absorb water. However, for any duration but an extremely long duration, there was no difference noted when the brass foil was omitted.

Polyurethane is quite strong structurally, and a metallic framework is not absolutely required for the stave 10. However, a metallic framework does add strength and facilitates connecting the individual staves 10 into a circular array of 64 staves.

The backbone of the stave 10 consists of a piece of aluminum channel 26 connected to two metallic end plates 28 and 30. Two bottom spacer blocks 32 and 34, one at each end, are attached by screws to the channel 26. The slab 18 of pressure release material is positioned over the bottom spacer blocks 32 and 34, which may be of aluminum. The function of the spacer blocks, 32 and 34, which are generally of metal, is to ensure that the pressure release material 18 is spaced the proper distance from the bottom of the backbone of the stave 10 formed by the channel-shaped member 26.

The wiring for the partially wired transducers 16 is completed, including the connection of the shading capacitors 36, which are positioned just below the slab 18. The leads to the transducers 16 and the capacitors 36 are combined into one cable 37 and finally connected to a waterproof connector 38.

Two end blocks, 40 and 42, are each connected by a pair of screws 44 and 46 to the precast elastomeric member 14.

The precast polyurethane member 14 with its completed wiring and the two end blocks 40 and 42, is carefully positioned over the slab of pressure release material 18.

Each of the end plates, 28 and 30, are attached to the end blocks 40 and 42 by a pair of screws 48.

The whole assembly having the components heretofore enumerated is placed into a final mold, with that end having the connector 38 at the bottom of the mold, and the assembly is then filled, by means of fill hole 50, with a potting compound, for example, polyurethane 12. Vent hole 52 permits air to escape, thus avoiding trapped air holes in the polyurethane 12U or 12L.

The final mold splits along a line through the cable 37, facilitating taking the final molded product, the stave 10, out of the mold.

Discussing now FIG. 4, the top conductor 54 is the ground lead for the complete circuit. This mode of ground connection minimizes electrostatic signal pickup.

Referring back to FIG. 4, it will be observed that not all of the transducers 16 have a capacitor 36 in series with it. The reason for this is as follows. As discussed hereinabove, the deep-submergence acoustic array stave assembly is designed to receive a signal of the proper overall radiation pattern by generating individual signals of the proper phase and amplitude at each transducer 16. At some of the transducers 16, a signal of the proper amplitude "shading" may be obtained by inserting a capacitor 36 having a certain predetermined value in series with the transducer 16. In general, the capacitance of the various capacitors 16 need not be identical.

The transducers 16 consist of lead zirconate titanate (PZT) hollow spheres with electrodes inside and outside, with one conductor connected to each electrode, polarized inward on one half of the stave 10 and outward on the other half, so that the outside electrode will always be at ground potential and the signal differentially developed and thus inherently immune to electrical interference, in differential amplifier 56, as is shown schematically in FIG. 4 and 5, by reference numerals 22 and 24. By this configuration, electrostatic coupling to the receiver system is reduced.

Each transducer sphere 16 is a pressure transducer, that is, it generates a voltage whenever it is in a pressure field. In the figures, each is shown as two hollow hemispheres, butting each other. One conductor goes to the inside of the sphere, while the other conductor goes to the outside of the sphere. Transducers in the shape of solid spheres or cylindrical transducers could have been used with a suitable electrode configuration.

The particular configuration for the transducer 16 is not as important as the fact that in a positive pressure field, one group of transducers, say group 22, generates a positive potential, while the other group 24 generates a negative potential.

Obviously many modifications and variations of the present invention are possible in the light of the above teachings. It is therefore to be understood that within the scope of the appended claims the invention may be practiced otherwise than as specifically described:

What is claimed is:

1. A transducer assembly for deep submergence, acoustic, signal processing at a predetermined frequency, comprising:
    a first elongated elastomeric member;
    a second elongated elastomeric member having a thickness of one-quarter wavelength in the direction of preferred signal propagation;
    a plurality of spaced transducers embedded in a linear row adjacent one surface of the second elastomeric member;
    a slab of pressure release material, having a thickness of one-quarter wavelength in the direction of preferred signal propagation, and engaged in parallel relationship with a side of the second elastomeric member opposite the side location of the transducers;
    the second elongated elastomeric member and the slab being embedded in the first elastomeric member; and
    each transducer having a pair of wires which extend from the second and first elastomeric members.

2. A transducer assembly according to claim 1 wherein the first elongated elastomeric member is in the shape of a stave.

3. A transducer assembly according to claim 1, further comprising;
    an elongated, metallic, channel-shaped base mounted to the first elastomeric member at the side which is opposite the row of transducers; and
    two end plates attached to the metallic base, one at each end.

4. A transducer assembly according to claim 1, wherein
    the first and second elastomeric members are made of polyurethane, and
    the slab of pressure release material consists of silica particles of a submicron size in a phenolic binder.

5. A transducer assembly according to claim 4, wherein
    the transducers are hollow spheres with electrodes inside and outside, so wired as to be polarized inward on one-half of the stave and outward on the other half, so that the transducer assembly may be connected to a differential amplifier.

6. A transducer assembly according to claim 4, wherein
    the transducers are hollow cylinders with electrodes inside and outside, so wired as to be polarized inward on one-half of the stave and outward on the other half, so that the transducer assembly may be connected to a differential amplifier.